United States Patent
Kumar (10) Patent No.: US 8,850,517 B2
(45) Date of Patent: Sep. 30, 2014

(54) RUNTIME RISK DETECTION BASED ON USER, APPLICATION, AND SYSTEM ACTION SEQUENCE CORRELATION

(71) Applicant: Taasera, Inc., Erie, PA (US)

(72) Inventor: Srinivas Kumar, Cupertino, CA (US)

(73) Assignee: Taasera, Inc., Erie, PA (US)

( * ) Notice: Subject to any disclaimer, the term of this patent is extended or adjusted under 35 U.S.C. 154(b) by 0 days.

(21) Appl. No.: 13/741,878

(22) Filed: Jan. 15, 2013

(65) Prior Publication Data

US 2014/0201806 A1 Jul. 17, 2014

(51) Int. Cl.
*H04J 1/16* (2006.01)
*G06F 17/30* (2006.01)
*G06F 21/57* (2013.01)

(52) U.S. Cl.
CPC ................................ *G06F 21/577* (2013.01)
USPC ................ 726/1; 726/3; 726/6; 709/223

(58) Field of Classification Search
CPC ... H04L 47/10; H04L 63/0227; H04L 63/102; H04L 47/2458
USPC ......................... 726/1–10; 709/223
See application file for complete search history.

(56) References Cited

U.S. PATENT DOCUMENTS

| | | | |
|---|---|---|---|
| 8,091,065 B2 * | 1/2012 | Mir et al. | 717/104 |
| 8,327,441 B2 * | 12/2012 | Kumar et al. | 726/22 |
| 2008/0288330 A1 | 11/2008 | Hildebrand et al. | |
| 2009/0292743 A1 | 11/2009 | Bigus et al. | |
| 2010/0125911 A1 | 5/2010 | Bhaskaran | |
| 2011/0131658 A1 | 6/2011 | Bahl | |
| 2011/0179477 A1 * | 7/2011 | Starnes et al. | 726/9 |
| 2011/0321175 A1 | 12/2011 | Slater | |
| 2012/0216244 A1 * | 8/2012 | Kumar et al. | 726/1 |
| 2013/0096980 A1 * | 4/2013 | Basavapatna et al. | 705/7.28 |

OTHER PUBLICATIONS

May 14, 2014 International Search Report issued in PCT/US2014/011427.
May 14, 2014 Written Opinion issued in PCT/US2014/011427.

* cited by examiner

*Primary Examiner* — Haresh N Patel
(74) *Attorney, Agent, or Firm* — Buchanan Ingersoll & Rooney PC (57) ABSTRACT

A method for assessing runtime risk for an application or device includes: storing, in a rules database, a plurality of rules, wherein each rule identifies an action sequence; storing, in a policy database, a plurality of assessment policies, wherein each assessment policy includes at least one rule of the plurality of rules; identifying, using at least one assessment policy, a runtime risk for an application or device, wherein the identified runtime risk identifies and predicts a specific type of threat; and identifying, by a processing device, a behavior score for the application or device based on the identified runtime risk, wherein the action sequence is a sequence of at least two performed actions, and each performed action is at least one of: a user action, an application action, and a system action.

24 Claims, 4 Drawing Sheets

RUNTIME RISK DETECTION BASED ON USER, APPLICATION, AND SYSTEM ACTION SEQUENCE CORRELATION

FIELD

The present disclosure relates to cognitive behavior recognition, specifically assessing the runtime risk of an application or device in a computer system using cognitive behavior recognition.

BACKGROUND

With the prevalence of computers and other computing systems in the daily lives of both companies and individuals, computer and cyber security has become increasingly important. A variety of programs and approaches have been developed to provide security and protect end users from harmful threats. Such programs that have been developed include antivirus programs, firewalls, and intrusion detection/prevention systems (IDSs/IPSs). These programs can be beneficial in protecting a computing system and its end user from a number of threats.

However, as technology in the computing devices themselves is developing, so is the technology behind the threats against those same computing device. Emerging cyber threats, commonly referred to as advanced persistent threats (APT), often remain undetected using traditional security programs and approaches. As a result, many harmful threats and infections can attack a system that includes these security programs unbeknownst to the user and system operator, which could have devastating results. For example, it can place companies at risk for the theft of proprietary information, such as confidential information, trade secrets, etc., and individuals at risk for identify theft.

Thus, there is a need for a technical solution to properly detect and prevent attacks by advanced persistent threats undetected using traditional security programs and approaches.

SUMMARY

The present disclosure provides a description of a system and method for the assessing of a runtime risk of an application or device.

A method for assessing runtime risk for an application or device includes: storing, in a rules database, a plurality of rules, wherein each rule identifies an action sequence; storing, in a policy database, a plurality of assessment policies, wherein each assessment policy includes at least one rule of the plurality of rules; identifying, using at least one assessment policy, a runtime risk for an application or device, wherein the identified runtime risk identifies and predicts a specific type of threat; and identifying, by a processing device, a behavior score for the application or device based on the identified runtime risk, wherein the action sequence is a sequence of at least two performed actions, and each performed action is at least one of: a user action, an application action, and a system action.

A system for assessing runtime risk for an application or device includes a rules database, a policy database, and a processing device. The rules database is configured to store a plurality of rules, wherein each rule identifies an action sequence. The policy database is configured to store a plurality of assessment policies, wherein each assessment policy includes at least one rule of the plurality of rules. The processing device is configured to identify, using at least one assessment policy, a runtime risk for an application or device, wherein the identified runtime risk identifies and predicts a specific type of threat, and identify a behavior score for the application or device based on the identified runtime risk, wherein the action sequence is a sequence of at least two performed actions, and each performed action is at least one of: a user action, an application action, and a system action.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Assessing Runtime Risk for an Application or Device

Figure 1:
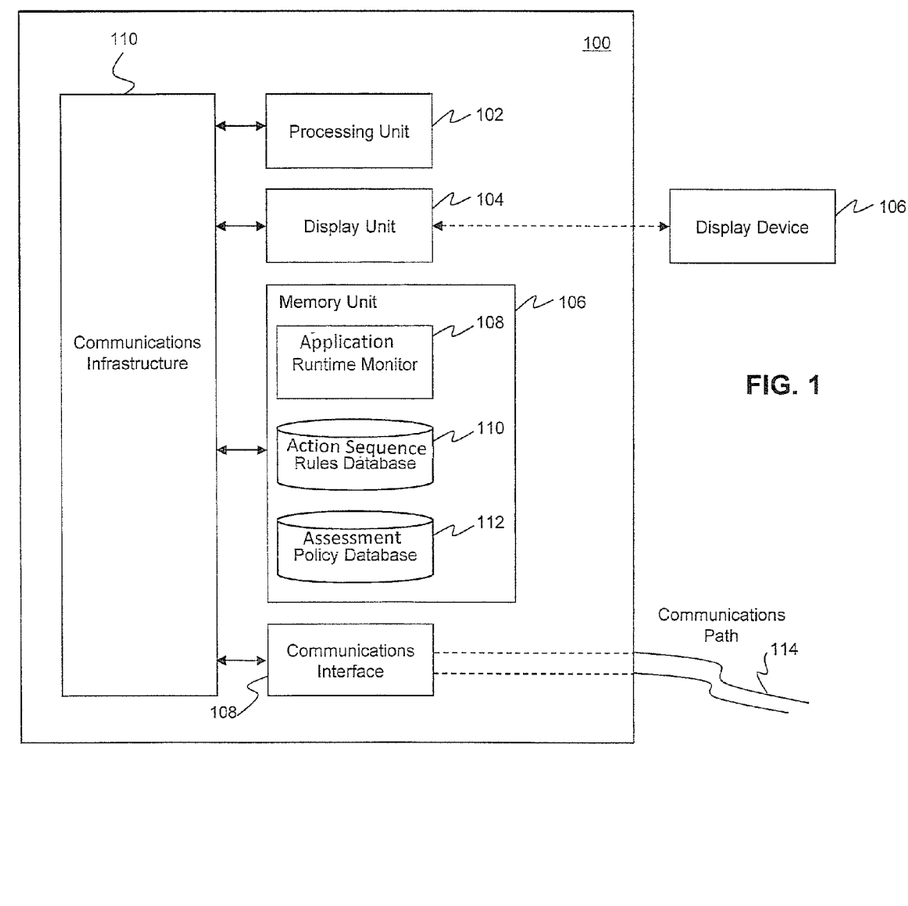
FIG. 1 is a high level architecture illustrating a system for assessing the runtime risk for an application or device in accordance with exemplary embodiments.

FIG. 1 is a high level architecture illustrating a computing system 100 configured to assess the runtime risk of an application or device and identify a behavior score based on the assessed runtime risk. It will be apparent to persons having skill in the relevant art that methods and processes disclosed herein may be implemented in the computing system 100 using hardware, software, firmware, non-transitory computer readable media having instructions stored therein, or a combination thereof, and may be implemented in more than one computing systems or other processing systems. It will be further apparent to persons having skill in the relevant art that the configuration of the computing system 100 as illustrated in FIG. 1 is provided as an illustration, and other configurations and systems for performing the functions disclosed may be suitable.

The computing system 100 may include a processing unit 102. The processing unit 102 may include a single processor or a plurality of processor, each of which may include one or more processor cores. The processing unit 102 may be a general purpose processing unit or a special purpose processing unit, such as a general purpose processing unit programmed for performing a specific purpose, such as the identification of the runtime risk of an application or program. The processing unit 102 may be configured to connect to a communications infrastructure 110 for communication with additional components of the computing system 100.

The communications infrastructure 110 may be a bus, message queue, network, multi-core message-passing scheme, a combination thereof, or any other suitable type or configuration of communications infrastructure as will be apparent to persons having skill in the relevant art. The computing system 100 may further include a display unit 104. The display unit 104 may be configured to control a display device 106, which may be connected to the computing system 100 physically (e.g., via a cable, such as a VGA, DVI, or HDMI cable) or wirelessly (e.g., via Bluetooth, etc.). The display unit 104 may be a video card, video adapter, graphics card, display card, graphics board, display adapter, graphics adapter, video controller, graphics controller, etc. and may be integrated into the computing system 100 or may be removable.

The display device 106 may be configured to display information (e.g., data, graphics, output from an application program, etc.) transmitted to the display device 106 via the display unit 104. Suitable types of display devices for use as the display device 106 will be apparent to persons having skill in the relevant art and may include a liquid crystal display (LCD), light-emitting diode (LED) display, thin film transistor (TFT) LCD, capacitive touch display, etc.

The computing system 100 may further include a memory unit 106. The memory unit 106 may be any type of memory suitable for the storage of data and performing of the functions disclosed herein, such as a hard disk drive, floppy disk drive, magnetic tape drive, optical disk drive, solid state drive, or other non-transitory computer readable medium. In some embodiments, the memory unit 106 may be removable storage (e.g., flash memory, a compact disc, digital versatile disc, Blu-ray disc, etc.) or a combination of non-removable and removable storage. In one embodiment, the memory unit 106 may be external to the computing system 100 and accessed via a network by a communications interface 108, discussed in more detail below, such as cloud storage. The memory unit 106 may include random access memory (RAM), read-only memory (ROM), or a combination thereof. Suitable types and configurations of the memory unit 106 will be apparent to persons having skill in the relevant art.

The memory unit 106 may include at least a runtime monitor 108, a rules database 110, and a policy database 112. The memory unit 106 may include additional data, applications, programs, etc. as will be apparent to persons having skill in the relevant art, such as an operating system, drivers for components of the system 100, etc. The runtime monitor 108 may be an application program stored on the memory unit 106 including program code executable by the processing unit 102, configured to assess the runtime risk of an application (e.g., stored in the memory unit 106 and executed by the processing unit 102) or device (e.g., connected to the computing system 100 externally (e.g., via the communications interface 108) or internally (e.g., via the communications infrastructure 110), as discussed in more detail below. In some embodiments, the runtime monitor 108 may be further configured to identify a behavior score for an action sequence of at least two performed actions executed by (e.g., by components or programs included in) the computing system 100.

The runtime monitor 108 may be configured to perform additional functions in the computing system 100, such as those described in U.S. Pat. No. 8,372,441, filed as U.S. application Ser. No. 13/399,065, entitled "System and Method for Application Attestation," filed on Feb. 17, 2012; U.S. application Ser. No. 13/559,707, entitled "Systems and Methods for Orchestrating Runtime Operational Integrity" and filed on Jul. 27, 2012; U.S. application Ser. No. 13/559,766, entitled "Systems and Methods for Threat Identification and Remediation" and filed on Jul. 27, 2012; U.S. application Ser. No. 13/559,665, entitled "Systems and Methods for Providing Mobile Security Based on Dynamic Attestation" and filed on Jul. 27, 2012; U.S. application Ser. No. 13/559,692, entitled "Systems and Methods for Using Reputation Scores in Network Services and Transactions to Calculate Security Risks to Computer Systems and Platforms" and filed on Jul. 27, 2012; and U.S. application Ser. No. 13/559,732, entitled "Systems and Methods for Network Flow Remediation Based on Risk Correlation" and filed on Jul. 27, 2012, which are herein incorporated by reference in their entirety. Additional functions that may be performed by the runtime monitor 108 will be apparent to persons having skill in the relevant art.

The rules database 110 may be configured to store a plurality of rules, wherein each rule identifies an action sequence. An action sequence, discussed in more detail below, may include a sequence of at least two performed actions, wherein the performed actions may be one of a user action, an application action, and a system action. The policy database 112 may be configured to store a plurality of assessment policies, wherein each assessment policy includes at least one rule of the plurality of rules stored in the rules database 112. The runtime monitor 108 may be configured to identify the runtime risk of the application or device using at least one of the assessment policies stored in the policy database 112 based on, for example, matching rules and probabilistic weights and scores. Methods for identifying runtime risk using an assessment policy comprised of one or more rules is discussed in more detail below.

The rules database 110 and the policy database 112 may be configured in any type of suitable database configuration, such as a relational database, a structured query language (SQL) database, a distributed database, an object database, etc. Suitable configurations and database storage types will be apparent to persons having skill in the relevant art. The databases may each be a single database, or may comprise multiple databases which may be interfaced together, such as physically (e.g., internally via the communications infrastructure 110 or externally via the communications interface 108) or wirelessly (e.g., via Bluetooth), and may include one or more databases included within the computing system 100 and one or more databases external to the computing system 100, such as an external hard disk drive or storage accessed via a network (e.g., in the cloud).

The communications interface 108 may be configured to allow software and data to be transmitted between the computing system 100 and external networks and devices. The communications interface 108 may be a modem, network interface card (e.g., an Ethernet card), a communications port, a Personal Computer Memory Card International Association (PCMCIA) card, or other type of communications interface suitable for performing the functions disclosed herein as will be apparent to persons having skill in the relevant art. Software and data transmitted to or from the computing system 100 may be in the form of signals, which may be electronic, electromagnetic, optical, etc. The signals may travel via a communications path 114, which may be configured to carry the signals physically or wirelessly via a network. For example, the communications path 114 may carry signals from the communications interface 108 to a network such as a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art.

The communications interface 108 may be further configured to connect the computing system 100 with a plurality of input devices, which may enable a user of the computing system 100 to control the system. In some instances, the communications interface 108 may include multiple interfaces or connections, for connecting to a variety of external devices or networks. For example, the communications interface 108 may include a plurality of universal serial bus (USB) connectors, an Ethernet connector, audio connectors, video connectors, etc. Suitable types of input devices that may be used with the computing system 100 for providing input will be apparent to persons having skill in the relevant art and may include a keyboard, mouse, touch screen, tablet, click wheel, trackball, microphone, camera, etc.

Figure 2:
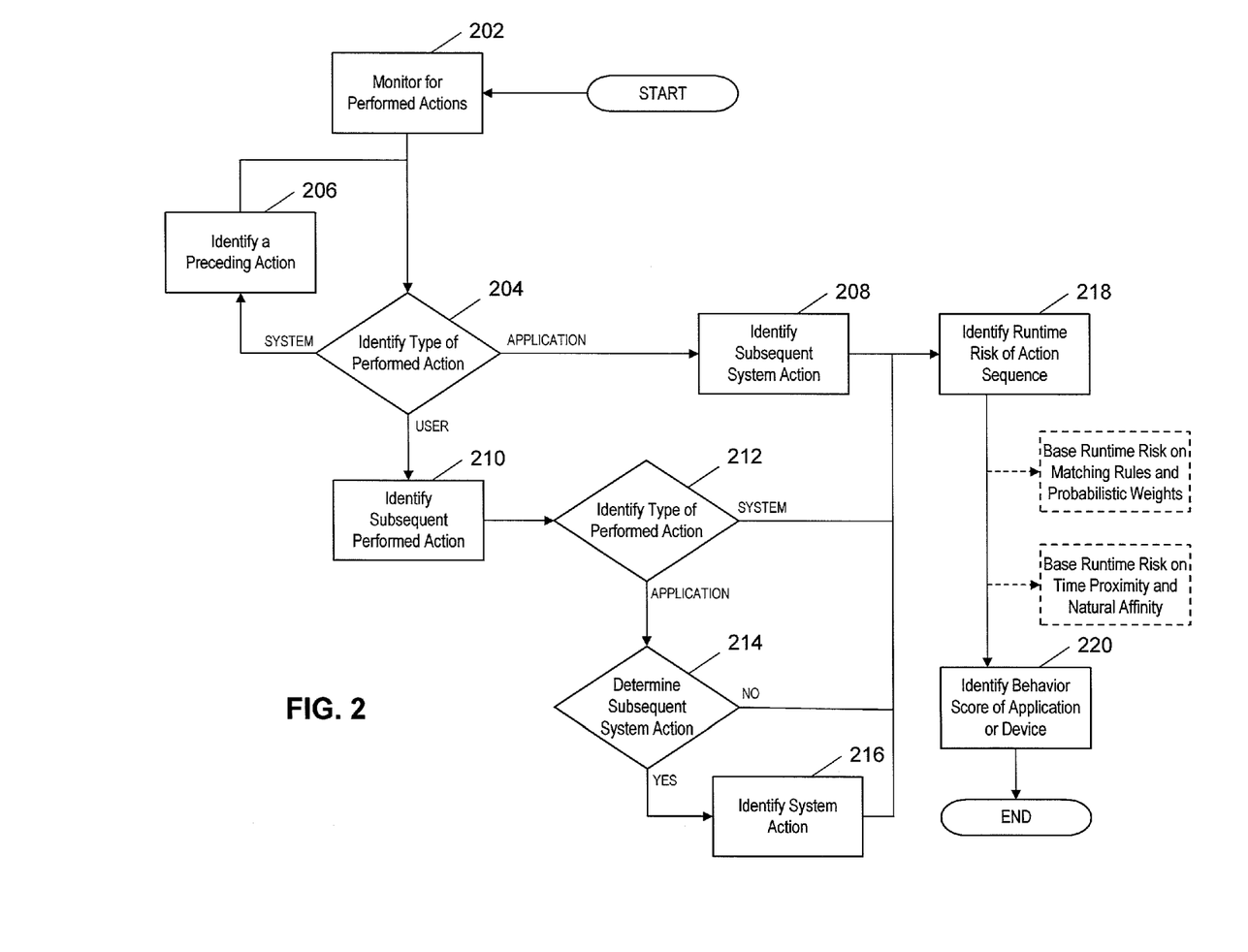
FIG. 2 is a flow diagram illustrating a method for identifying an action sequence and assessing a runtime risk and subsequent behavior score based on the identified action sequence in accordance with exemplary embodiments.

Method for Identifying Runtime Risk and Behavior Score for an Application or Device FIG. 2 is a flow diagram illustrating a method for identifying an action sequence of actions performed in the computing system 100 and identifying the corresponding runtime risk and a behavior score for an application or device involved in the action sequence. It will be apparent to persons having skill in the relevant art that the action sequences identified using the method illustrated in FIG. 2 are provided as means of illustration only and are not exhaustive as to action sequences that may be suitable for use in identifying the runtime risk of an application or device by the runtime monitor 108 of the computing system 100.

In step 202, the runtime monitor 108 may monitor the computing system 100 for performed actions, which may include user actions, application actions, and system actions, each of which are discussed in more detail below with respect to FIG. 3. Once an action is detected by the runtime monitor 108, in step 204 the runtime monitor may (e.g., via the processing unit 102) identify the type of action performed. If the type of action performed is a system action, then, in step 206, the runtime monitor 108 may attempt to identify an action preceding the system action. Then, the process may return to step 204 to identify the type of action of the preceding action, such that an action sequence including only system actions may not be used to identify a runtime risk of an application or device, as no action involving the application or device may be performed.

If the identified action is an application action, then, in step 208, the runtime monitor 108 may monitor for a subsequent system action, which may be identified by the processing unit 102. The application action followed by the system action may be an action sequence, as discussed in more detail below, which may be used to identify the runtime risk of an application or device (e.g., whose application action caused the system action to occur) at step 218, also discussed in more detail below. If the action identified at step 204 is a user action, then the runtime monitor 108 may monitor for any type of subsequent action, which may be identified by the processing unit 102 in step 210. At step 212, the processing unit 102 may identify if the subsequent performed action is a system action or an application action.

If the action is identified in step 212 as being a system action, then the user action followed by the system action may be identified as an action sequence suitable for identifying the runtime risk of an application or device (e.g., which, when triggered by the user action, caused the system action to occur). If the action identified in step 212 is an application action, then, at step 213, the runtime monitor 108 may monitor for, and the processing unit 102 may identify, a subsequent system action. If no subsequent system action is identified, then the user action followed by the application action may be identified as a suitable action sequence. If, on the other hand, a subsequent system action occurs, then, in step 216, the processing unit 102 may identify the system action that occurred, which may identify a user action followed by an application action and a subsequent system action as a suitable action sequence.

In step 218, the processing unit 102 (e.g., executing the application program of the runtime monitor 108), may identify the runtime risk of the application or device based on the identified action sequence. The runtime risk may identify and/or predict a specific type of threat caused by the application or device. For example, a runtime risk may identify a physical damage threat, accidental threat, deliberate threat, a threat of technical failure, a compromise of function or information, a combination thereof, etc. In some instances, multiple runtime risks may be identified corresponding to multiple types of threats. The runtime risk may be identified using at least one assessment policy stored in the policy database 112. Each assessment policy may comprise one or more rules stored in the rules database 110 and may identify the runtime risk based on matching rules and probabilistic weights and scores. Types and values of probabilistic weights and scores that may be used by an assessment policy for identifying the runtime risk of an application or device will be apparent to persons having skill in the relevant art.

The rules stored in the rules database 110 may each identify an action sequence. For example, one or more rules in the rules database 110 may identify an action sequence including a user action followed by a system action. Additional types of action sequences that may be identified by a corresponding rule in the rules database 110 will be apparent to persons having skill in the relevant art and are discussed in more detail below with respect to FIG. 3. The identification of the runtime risk of an action sequence is also discussed in more detail below with respect to FIG. 3.

In step 220, the runtime monitor 108 may identify a behavior score of the application or device, which may be based on the identified runtime risk of the application or device. The behavior score may be a number or other value (e.g., a rating) that may indicate the risk or threat of the application or device to the computing system 100 or other device (e.g., a network connected to the computing system 100 via the communications interface 108, etc.). In some embodiments, the behavior score may indicate the risk or threat of the specific identified action sequence involving the application or device. In other embodiments, the behavior score may indicate the risk or threat of the application or device as a whole to the computing system 100 or other device.

Action Sequences

Figure 3A:
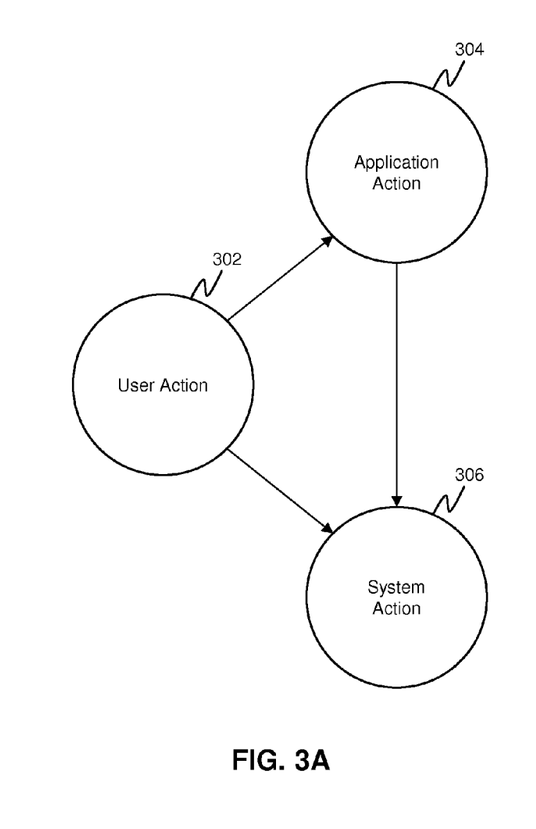
FIGS. 3A and 3B are a diagram illustrating performed actions and action sequences identified using the method of FIG. 2 in accordance with exemplary embodiments.
Figure 3B:
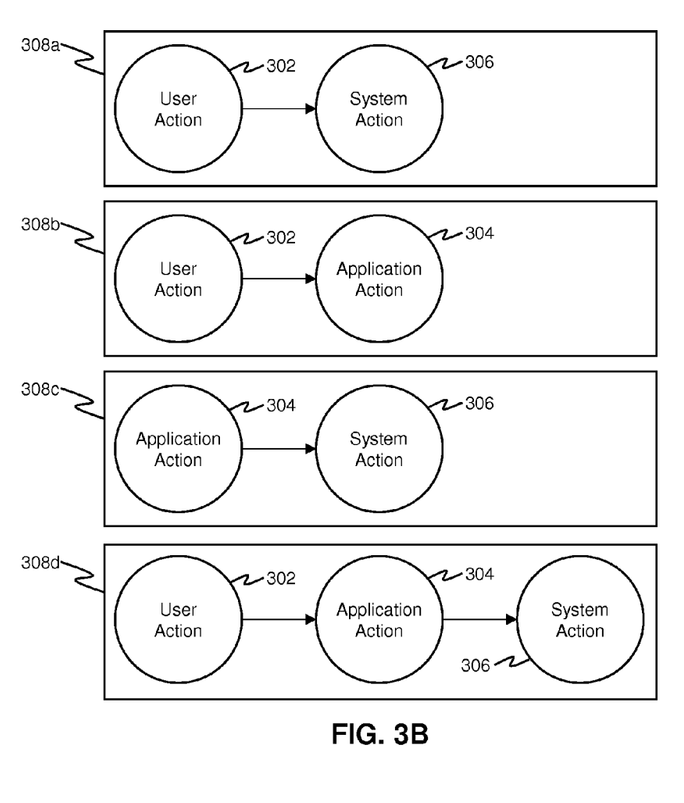

FIG. 3 is an illustration of the performed actions and exemplary action sequences that may be used by the computing system 100 and in the method illustrated in FIG. 2 for assessing the runtime risk of an application or device.

The runtime monitor 108 of the computing system 100 may monitor for actions performed in/by the computing system 100. The performed actions monitored by the runtime monitor 108 and identified by the processing unit 102 may include a user action 302, an application action 304, and a system action 306. The user action 302 may be any form of explicit input from a user of the computing system 100. For example, the user action may include a program launch, keyboard input, click of a mouse, touch input on a touch screen, moving of a mouse, scrolling or clicking on a click wheel, voice command into a microphone, gestures into a device configured to read human gestures, etc.

The application action 304 may be any activity performed by the application (e.g., stored in the memory unit 106 and executed by the processing unit 102) initiated programmatically by a task in execution of the computing system 100. In an exemplary embodiment, the application performing the application action 304 may be the application for which the runtime risk is identified or an application controlled by or configured to control the device for which the runtime risk is identified. The application action 304 may include, for example, a start type (e.g., console, service, parent process, script), first time execution, fork process (e.g., child process creation), code injection methods, keyboard capture methods, screen capture methods, dynamic code blocks, open data documents, automatic or self-termination, abnormal terminations (e.g., exception conditions), multiple restarts, opening of device(s) (e.g., the device for which the runtime risk is identified), process enumeration, cryptography, communication protocols, performance metrics, etc. as will be apparent to persons having skill in the relevant art.

The system action 306 may be any operation performed by the computing system 100 (e.g., by one or more components included in the computing system 100) on behalf of, or as a consequence of, an application or user action that changes the state of the computing system. The system action 306 may include, for example, system file creation, system folder modification, registry modifications or additions, application setting modifications, driver install or uninstall (e.g., system files), network activity, execution from temporary system folders, alternate data streams (ADS), environmental aspects (e.g., debugger presence, virtual environments, system boot times/sequences), etc.

The runtime monitor 108 may be configured to identify (e.g., using the method illustrated in FIG. 2 and discussed above), an action sequence 308 used to identify the runtime risk of an application or device. The action sequence 308 may include at least two performed actions, and may indicate a set of actions performed in the computing system 100. For example, the action sequence 308a may include a user action 302 followed by a system action 306. In some embodiments, the runtime monitor 108 may identify the time at which each performed action occurs. For example, for the action sequence 308a, the runtime monitor 108 may identify the user action 302 occurring at a time $T_u$ and the system action 306 occurring at time $T_s$ where $T_s > T_u$ such that the user action 302 was performed first and the system action 306 performed second.

Additional action sequences 308 that may be identified by the runtime monitor 108 and used to identify the runtime risk of an application or device may include action sequences 308b, 308c, and 308d. Action sequence 308b may include a user action 302 followed by an application action 304. Action sequence 308c may include an application action 304 followed by a system action 306. Action sequence 308d may include three preformed actions, such as a user action 302 followed by an application 304, which is further followed by the system action 306. In such an action sequence, the runtime monitor 108 may identify that the user action 302 occurred at time $T_u$, the application action 304 at time $T_a$, and the system action 306 at time $T_s$, where $T_s > T_a > T_u$. Additional action sequences that may be identified by the runtime monitor will be apparent to persons having skill in the relevant art.

The runtime monitor 108 may be further configured to identify the authenticity of the action sequence 308, such that an authentic action sequence may indicate that there is a forensic chain of events or a natural progression between the performed actions. In such an instance, authenticating action sequences may enable the runtime monitor 108 to not consider action sequences that are purely circumstantial (e.g., where an application action 304 or system action 306 is not a result of the user action 302). This may result in more accurate scoring of behaviors and runtime risk, and also result in more efficient identification of runtime risks and behavior scores due to less processing required. The runtime monitor 108 may authenticate an action sequence based on a plurality of factors, which may include at least one of: ordered sequences, unordered sequences, proximity analysis, outliers, probabilistic weights and scores, and probable action inferences based on an application's competency detected at runtime or based on a static and/or dynamic analysis of associated binaries, and any other suitable factors that will be apparent by persons having skill in the relevant art.

The runtime monitor 108 may authenticate an action sequence 308 and determine the runtime risk using at least one assessment policy, which in turn includes at least one rule of the plurality of rules, based on the time proximity (e.g., as included in the action sequence) and natural affinity that may be logically inferred between the performed actions in the action sequence 308. For example, the modification of a file or a registry key value for the computing system 100 upon the opening of a document (e.g., PDF, Excel, PowerPoint, Word, etc.) attached to an e-mail without any user intervention may not be a natural progression for an action sequence, and may therefore indicate a significant runtime risk.

Action sequences of actions performed in the computing system 100 may include, for example, a process chain (e.g., a launch sequence), an execution profile (e.g., performance metrics), an explicit user action (e.g., opening of a web link, opening of an e-mail attachment, insertion of a device), inactivity of a user, creation of a system file, modification of a system file, system application program interface (API) invocations, device access or operations (e.g., camera, microphone, card readers, universal serial bus drives, etc.), information access (e.g., contact list, global positioning system location, security settings, etc.), network activity, etc. The runtime monitor 108 may identify an action sequence 308 as normal, abnormal, or an outlier, based on the factors, policies, and rules as discussed above.

For example, a user may install an application (e.g., the user action 302), which may, as part of its installation, cause the processing unit 102 (e.g., the application action 304) to modify the registry (e.g., the system action 306). In such an instance, the runtime monitor 108 may identify the action sequence as being a normal sequence, and may identify the action sequence and/or the application as having a minimal runtime risk and assign a corresponding behavior score. In another example, a user may insert a removable media into the computing system 100 (e.g., the user action 302), which may, automatically and transparent to the user, cause the processing unit 102 (e.g., the application action 304) to delete system files and registry keys (e.g., the system action 306). The runtime monitor 108 may identify such an action sequence as abnormal and may identify the device (e.g., the removable media) as having a significant runtime risk. Action sequences that may be considered normal, abnormal, or an outlier may vary from computing system to computing system and situation to situation as will be apparent to persons having skill in the relevant art.

Exemplary Method for Assessing Runtime Risk for an Application or Device

Figure 4:
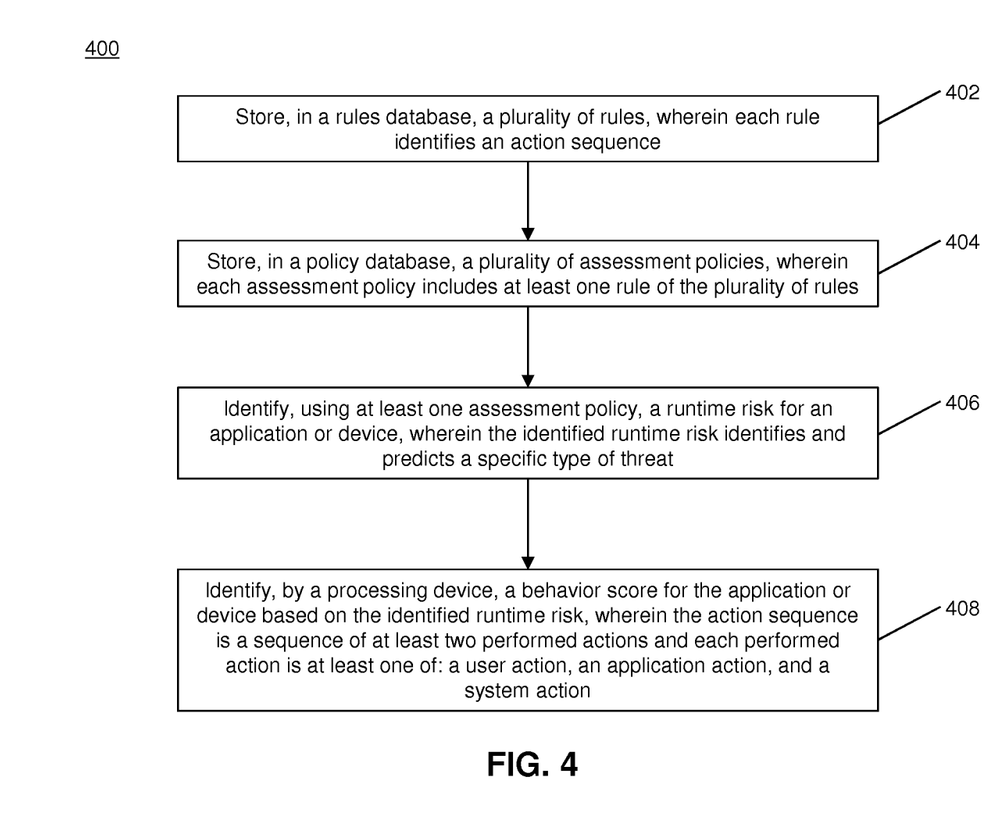
FIG. 4 is a flow diagram illustrating a method for creating a transaction record in accordance with exemplary embodiments.

FIG. 4 illustrates an exemplary method 400 for the assessing of the runtime risk for an application or device in the computing system 100.

In step 402, a plurality of rules may be stored in a rules database (e.g., the rules database 110), wherein each rule identifies an action sequence. The action sequence may be a sequence of at least two performed actions, wherein each performed action is at least one of: a user action (e.g., the user action 302), an application action (e.g., the application action 304), and a system action (e.g., the system action 306). In step 404, a plurality of assessment policies may be stored in a policy database (e.g., the policy database 112), wherein each assessment policy includes at least one rule of the plurality of rules.

In step 406, a runtime risk for an application or device may be identified using at least one assessment policy, wherein the identified runtime risk identifies and predicts a specific type of threat. In one embodiment, the runtime risk may be identified based on matching rules and probabilistic weights and scores. In some embodiments, the runtime risk may be identified based on time proximity of the at least two performed actions of the action sequence and natural affinity inferred between the at least two performed actions. In step 408, a behavior score for the application or device may be identified, by a processing device (e.g., the processing unit 102) based on the identified runtime risk.

The user action 302 may be any form of explicit input from a user of the computing system 100. The application action 304 may be any activity performed by the application initiated programmatically by a task in execution of the computing system 100. The system action 306 may be any operation performed by the computing system 100 on behalf or, or as a consequence of, a user action 302 or application action 304 that changes the state of the computing system 100.

In one embodiment, the method 400 may further include assessing, by the processing device 102, that the at least two performed actions of the action sequence describe a forensic chain of events based on a plurality of factors, wherein the plurality of factors include at least one of: ordered sequences, unordered sequences, proximity analysis, outliers, probabilistic weights and scores, and probable action inferences based on an application's competency.

In some embodiments, the at least two performed actions may include a first action performed at a first time and a second action performed at a second time. In a further embodiment, the second time may occur after the first time (e.g., such that the first action is performed prior to the second action). In an even further embodiment, the first action may be a user action 302 and the second action may be a system action 306. In an alternative further embodiment, the first action may be a user action 302 and the second action may be an application action 304. In yet another alternative embodiment, the first action may be an application action 304 and the second action may be a system action 306. In one embodiment, the action sequence may include three performed actions including a user action 302, an application action 304, and a system action 306, where the application action 304 is performed temporally after the user action 302 and the system action 306 is performed temporally after the application action 304.

Techniques consistent with the present disclosure provide, among other features, a system and method for the assessment of the runtime risk of an application or device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for assessing runtime risk for an application program that executes on a device, comprising:
    storing, in a rules database, a plurality of rules, wherein each rule identifies an action sequence;
    storing, in a policy database, a plurality of assessment policies, wherein each assessment policy includes at least one rule of the plurality of rules;
    identifying, using at least one assessment policy, a runtime risk for an application program that executes on a device, wherein the identified runtime risk indicates a risk or threat of the identified action sequence of the application; and
    identifying, by a runtime monitor including a processing device, a behavior score for the application program that executes on the device based on the identified runtime risk, wherein
    the action sequence is a sequence of at least two performed actions, and
    each performed action is at least one of: a user action, an application action, and a system action.

2. The method of claim 1, wherein the user action is any form of explicit input from a user of a computing system.

3. The method of claim 1, wherein the application action is any activity performed by the application initiated programmatically by a task in execution of a computing system.

4. The method of claim 1, wherein the system action is any operation performed by a computing system on behalf of, or as a consequence of, a user action or application action that changes the state of the computing system.

5. The method of claim 1, wherein a first action of the at least two performed actions is performed at a first time, and the second action of the at least two performed actions is performed at a second time.

6. The method of claim 5, wherein
    the first action is a user action,
    the second action is a system action, and
    the second time occurs after the first time.

7. The method of claim 5, wherein
    the first action is a user action,
    the second action is an application action, and
    the second time occurs after the first time.

8. The method of claim 5, wherein
    the first action is an application action,
    the second action is a system action, and
    the second time occurs after the first time.

9. The method of claim 1, wherein
    the action sequence includes three performed actions,
    a first action of the three performed actions is a user action,
    a second action of the three performed actions is an application action,
    a third action of the three performed actions is a system action,
    the second action is performed temporally after the first action, and
    the third action is performed temporally after the second action.

10. The method of claim 1, wherein the runtime risk is identified based on matching rules and probabilistic weights and scores of performed actions on the device.

11. The method of claim 1, wherein the runtime risk is identified based on time proximity of the at least two performed actions of the action sequence and natural affinity inferred between the at least two performed actions.

12. The method of claim 1, further comprising:
    assessing, by the processing device, that the at least two performed actions of the action sequence describe a forensic chain of events based on a plurality of factors, wherein the plurality of factors includes at least one of: ordered sequences, unordered sequences, proximity analysis, outliers, probabilistic weights and scores, and probable action inferences based on an application's competency.

13. A system for assessing runtime risk for an application program that executes on a device, comprising:
- a rules database storing a plurality of rules, wherein each rule identifies an action sequence;
- a policy database storing a plurality of assessment policies, wherein each assessment policy includes at least one rule of the plurality of rules; and
- a runtime monitor including a processing device
   - identifying, using at least one assessment policy, a runtime risk for an application program that executes on a device, wherein the identified runtime risk indicates a risk or threat of the identified action sequence of the application, and
   - identifying a behavior score for the application program that executes on the device based on the identified runtime risk, wherein
- the action sequence is a sequence of at least two performed actions, and
- each performed action is at least one of: a user action, an application action, and a system action.

14. The system of claim 13, wherein the user action is any form of explicit input from a user of a computing system.

15. The system of claim 13, wherein the application action is any activity performed by the application initiated programmatically by a task in execution of a computing system.

16. The system of claim 13, wherein the system action is any operation performed by a computing system on behalf of, or as a consequence of, a user action or application action that changes the state of the computing system.

17. The system of claim 13, wherein a first action of the at least two performed actions is performed at a first time, and the second action of the at least two performed actions is performed at a second time.

18. The system of claim 17, wherein
the first action is a user action,
the second action is a system action, and
the second time occurs after the first time.

19. The system of claim 17, wherein
the first action is a user action,
the second action is an application action, and
the second time occurs after the first time.

20. The system of claim 17, wherein
the first action is an application action,
the second action is a system action, and
the second time occurs after the first time.

21. The system of claim 13, wherein
the action sequence includes three performed actions,
a first action of the three performed actions is a user action,
a second action of the three performed actions is an application action,
a third action of the three performed actions is a system action,
the second action is performed temporally after the first action, and
the third action is performed temporally after the second action.

22. The system of claim 13, wherein the runtime risk is identified based on matching rules and probabilistic weights and scores of performed actions on the device.

23. The system of claim 13, wherein the runtime risk is identified based on time proximity of the at least two performed actions of the action sequence and natural affinity inferred between the at least two performed actions.

24. The system of claim 13, wherein
the processing device assesses that the at least two performed actions of the action sequence describe a forensic chain of events based on a plurality of factors, and
the plurality of factors includes at least one of: ordered sequences, unordered sequences, proximity analysis, outliers, probabilistic weights and scores, and probable action inferences based on an application's competency.

\* \* \* \* \*